(12) United States Patent
Rogers et al.

(10) Patent No.: US 8,887,149 B2
(45) Date of Patent: Nov. 11, 2014

(54) TIME SHIFT CONFIGURATION MANAGEMENT FOR SOFTWARE PRODUCT INSTALLATION

(75) Inventors: Brian Rogers, Redmond, WA (US); Michael Thomson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 220 days.

(21) Appl. No.: 13/400,792

(22) Filed: Feb. 21, 2012

(65) Prior Publication Data

US 2013/0219380 A1 Aug. 22, 2013

(51) Int. Cl.
*G06F 9/445* (2006.01)

(52) U.S. Cl.
USPC ............ 717/172; 717/121; 717/168; 717/175

(58) Field of Classification Search
CPC .......................................................... G06F 8/61
USPC ........... 717/168–178, 120–123; 709/220–226
See application file for complete search history.

(56) References Cited

U.S. PATENT DOCUMENTS

| 6,438,749 | B1 | 8/2002 | Chamberlain | |
|---|---|---|---|---|
| 7,552,430 | B2 | 6/2009 | Napier et al. | |
| 7,703,090 | B2 | 4/2010 | Napier et al. | |
| 7,865,888 | B1 * | 1/2011 | Qureshi et al. | 717/168 |
| 2003/0220992 | A1 | 11/2003 | DiRico | |
| 2004/0003266 | A1 | 1/2004 | Moshir et al. | |
| 2006/0048129 | A1 * | 3/2006 | Napier et al. | 717/168 |
| 2006/0080656 | A1 | 4/2006 | Cain et al. | |
| 2008/0178168 | A1 | 7/2008 | Sriram et al. | |
| 2009/0210866 | A1 * | 8/2009 | Troan | 717/168 |
| 2011/0296404 | A1 * | 12/2011 | Zhang et al. | 717/178 |
| 2011/0307881 | A1 * | 12/2011 | Konersmann et al. | 717/171 |

OTHER PUBLICATIONS

Ajmani, Sameer. "A review of software upgrade techniques for distributed systems." Date: Aug. 7, 2002, pp. 1-19.*
Bellissimo, Anthony, John Burgess, and Kevin Fu. "Secure software updates: disappointments and new challenges." 1st USENIX Workshop on Hot Topics in Security (Vancouver, Canada), 2006, pp. 37-43.*
Di Cosmo, Roberto, Stefano Zacchiroli, and Paulo Trezentos. "Package upgrades in FOSS distributions: Details and challenges." Proceedings of the 1st International Workshop on Hot Topics in Software Upgrades. ACM, 2008, pp. 1-5.*
Mell, et al., "Creating a Patch and Vulnerability Management Program", In Technical Report, National Institute of Standards, Computer Security Division, Information Technology Laboratory, National Institute of Standards and Technology, MD 20899-8930, Special Publication 800-40, Version 2, Nov. 2005, 75 pages.

* cited by examiner

*Primary Examiner* — Satish Rampuria
(74) *Attorney, Agent, or Firm* — John Jardine; Jim Ross; Micky Minhas (57) ABSTRACT

Systems, methods and computer program products for providing software product configuration management through a time shift responsive to software product installation content, user inputs, and software product applicability rules are disclosed. A configuration engines may be loaded on a computing device, which access installation product content related to the software product via one or more data stores. The configuration engine detects the initial configuration state of the software product and accepts a user input identifying a desired final configuration state of the software product. The configuration engine applies at least one applicability rule to determine whether the installation product content needs to be acquired from the data store to achieve the desired final configuration state. The configuration engine modifies the software product from the initial configuration state to the desired final configuration state in a succinct and efficient manner without causing inoperability of the software product.

20 Claims, 7 Drawing Sheets

TIME SHIFT CONFIGURATION MANAGEMENT FOR SOFTWARE PRODUCT INSTALLATION

FIELD OF THE DISCLOSURE

The present disclosure relates to software product configuration management and more particularly to systems, methods and computer program products for facilitating software product configuration management through a time shift responsive to user input, installation product content and software product applicability rules.

BACKGROUND

After many software products are released to market (RTM), software developers periodically release additional product content for the software product. That is, when a software product deploys updated product content, an administrator (user) of an operating system may need to revert to a previous state of the software product due to work requirements, consulting engagements or bugs in the product content. The administrator often needs to be aware of all product content as well as when such product content was installed to correctly, and safely, remove undesired (i.e., problematic) product content during software product updating procedures. Often, the administrator removes product content or adds it, in a wrong sequence thereby causing software product instability and/or inoperability. This adversely impacts usability, and supportability of the software product; (e.g., a software support group has to ask the user to reinstall the entire operating system and/or software product to continue using the software product.)

Typically, to install product content on a computing device, a user needs to know several factors including: an initial configuration state of the software product; all previously-installed product content; requisite product content to achieve the desired final configuration state of the software product; the order of applying the product content during the updating process; and the remaining product content after modifying the software product.

Unfortunately, previously-installed product content is often located at a source external to the user's computing device, requiring the administrator to manually access and transfer such previously-installed product to the computing device. This is a time consuming and tedious process. Furthermore, the administrator needs to install the updated product content in a specific order to achieve a stable, desired final configuration state of the software product. Such an updating process requires the administrator to understand the above-listed factors and meticulously install the product content in a piece-meal manner. For single computers, such a product content updating process is complex. For multiple computing devices residing on an enterprise network, for example, the administrator needs to manage large quantities of product content, which may not be up-to-date for each computing device. This risk complicates the process of updating only selected computing devices on the enterprise network and jeopardizes the desired final configuration state of the software product residing on the enterprise network.

In a non-limiting exemplary scenario, as product content updates grow over time, most software products will build service packs which "roll up" product content into larger product content releases. Often such service packs cannot be uninstalled or, if they are, such a removal process cancels previously applied hotfixes and reverts the software product configuration state back to the previous full service pack (i.e., full software product release). Such an undesirable reversion process removes more than targeted product content updates and, thus fails to update a specific hotfix or feature pack within the larger service pack release.

That is, a product moving from an initial RTM configuration state to a Service Pack 1 (SP1) configuration state will target SP1 product content against delta updates released between the RTM and SP1 dates. This scenario occurs when the software product finds a security issue or other bug that needs to be fixed in product content released before and/or after SP1. For brevity, the present non-limiting exemplary scenario impacts only one file. The product content before SP1 does not have additional fixes that occurred when SP1 was released. Shipping such pre-SP1 product content will break functionality of the software product, thereby requiring shipment of two separate versions of the product content with each hotfix. The problem occurs when the administrator of the computing device updates the software product up to the SP1 release date. However, the initial SP1 product content was not aware of the hotfix and, therefore, does not update the hotfix during the updating process.

One conventional solution is to author the SP1 product content and render obsolete all delta updates that occurred between the RTM and SP1 dates. Another solution is to have a product content deployment engine copy all product content, to be removed or updated, to a temporary location thereby allowing a future rollback of such product content. Both solutions are time consuming and inefficient.

In another non-limiting exemplary scenario, the administrator may apply previously released product content patches out of sequence. If a selected delta patch is not using a subsystem (i.e., deployment engine) which is aware of applicability rules, such a delta patch may be erroneously applied in a manner that degrades software product functionality. Further, even if the delta patch is aware of applicability rules, the administrator may have to search through release notes, knowledge base articles or other product notification channels to find all applicable delta released updates to the product content. Often this inhibits the ability to discover and apply all requisite patches (updates) to the software product.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

This present disclosure addresses the above-identified needs by providing systems, methods and computer program products for facilitating software product configuration management through a time shift responsive to user input, installation product content and software product applicability rules.

Throughout the present disclosure, "software product" includes, but is not limited to, operating systems of a single computing device and/or a network of computing devices, video games, productivity software, mobile applications, global and local software applications, binaries, kernels, individual files, and other software content such as audiovisual content.

"Product content" and "released product content" are interchangeably employed and include, but are not limited to, patches, hotfixes, feature packs, services packs, and visual, audio or audiovisual files. Such product content can be associated with and modifies the software product executed by a single computing device and/or a network of computing devices. Thus, the software product includes product content.

"Installed product content" and "installation product content" are interchangeably employed and defined as product content that has been previously installed on a computing device and/or a network of computing devices.

In an embodiment, functionality of a configuration engine allows an administrator to modify the initial configuration state of a software product through a "time shift." Such a time shift notifies the user of the initial product content configuration, including all installed product content and, further, identifies the desired final product configuration and associated product content that needs to be moved forward or backwards in time relative to an administrator-selected target date. That is, the user is able to modify installed product content through a graphical user interface in a manner that does not require the user to know the sequence of any perquisite/requisite product content updates to the software product.

An embodiment provides detailed information of all installed product content on the operating system as well as which product files, binaries and other currently-installed information.

An embodiment enables the administrator to run a software program update process at an administrator-selected date beginning from the RTM date of the product content. Such a function ensures all released product content is correctly aligned and installed for the desired final configuration state of the software program.

An embodiment enables the administrator, in one product content installation cycle, to modify all software product updates with all released product content, and/or with previously product content released up to a desired date.

An embodiment enables the administrator to quickly and efficiently modify all appropriate product content for a software product with minimal administrator input after the administrator selects the desired target release date associated with the desired final configuration state. That is, a data store containing all released product content provides a configuration layout (chronological sequence of all product content) of all hotfixes, feature packs and service packs and other product content that enables the configuration engine to modify desired portions of the product content in an appropriate sequence.

An embodiment of the present disclosure enables installation product content (updates) to remain fixed at a given time in previous installation dates so future product content updates do not experience problems found with the previously released product content. Such software configuration management allows product content to remain unchanged and eliminates the need to test the software product's compatibility with the newly-installed product content. That is, existing product content can be overwritten on the computing device and/or operating system with newer released product content and then reacquired later if the administrator decides to revert the software product back to a previous configuration state. Such an advantageous function occurs because the configuration engine is authored to access the data store and learn all product content released for the software product.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements.

DETAILED DESCRIPTION

In non-limiting exemplary embodiments, systems, methods and computer program products provide software product configuration management through a time shift that is responsive to software product installation content, user inputs, and software product content applicability rules. That is, when updating installation product content for a software product, delta product content delivery (i.e., hotfixes, service pack, features packs, etc.) are sequentially categorized in a data store. By employing the data store, a configuration engine learns all product content and detects an initial configuration state of the operating system and/or software product. The configuration engine executes applicability rules (i.e., business intelligence logic) to sequentially configure all requisite product content during software product update procedures.

In an embodiment, the configuration engine communicates with the data store product content thereby ensuring the administrator is able to acquire all new delta product content at specified location(s) in the data store. Such location(s) can remain static throughout a lifecycle of the software product, and assist the administrator to succinctly update desired portions of the released product content without unnecessarily removing remaining portions of the previously-installed product content. The configuration engine executes such an efficient product content updating procedure because it has learned which hotfixes, feature packs, service packs are needed from the data store. That is, a newly-released hotfix is aware of all product content before and after SP1. This allows a previously-installed configuration engine, with the pre-SP1 hotfix, to efficiently update the software product with the new SP1 hotfix by: removing only relevant portions of the previously-installed product content from the pre-SP1 hotfix, updating SP1, and then installing the post-SP1 hotfix.

In an embodiment, the administrator may access product content release schedules at a desired date (target date) even though such product content is not currently installed directly on the computing device. Because the configuration engine is content aware (i.e., learns all released product content), an administrator may acquire the latest configuration engine (or any configuration engine equal to or newer than the target date) and simply select the target date—install point—thereby sequentially deploying only the desired new product content in a simplified process.

Figure 1:
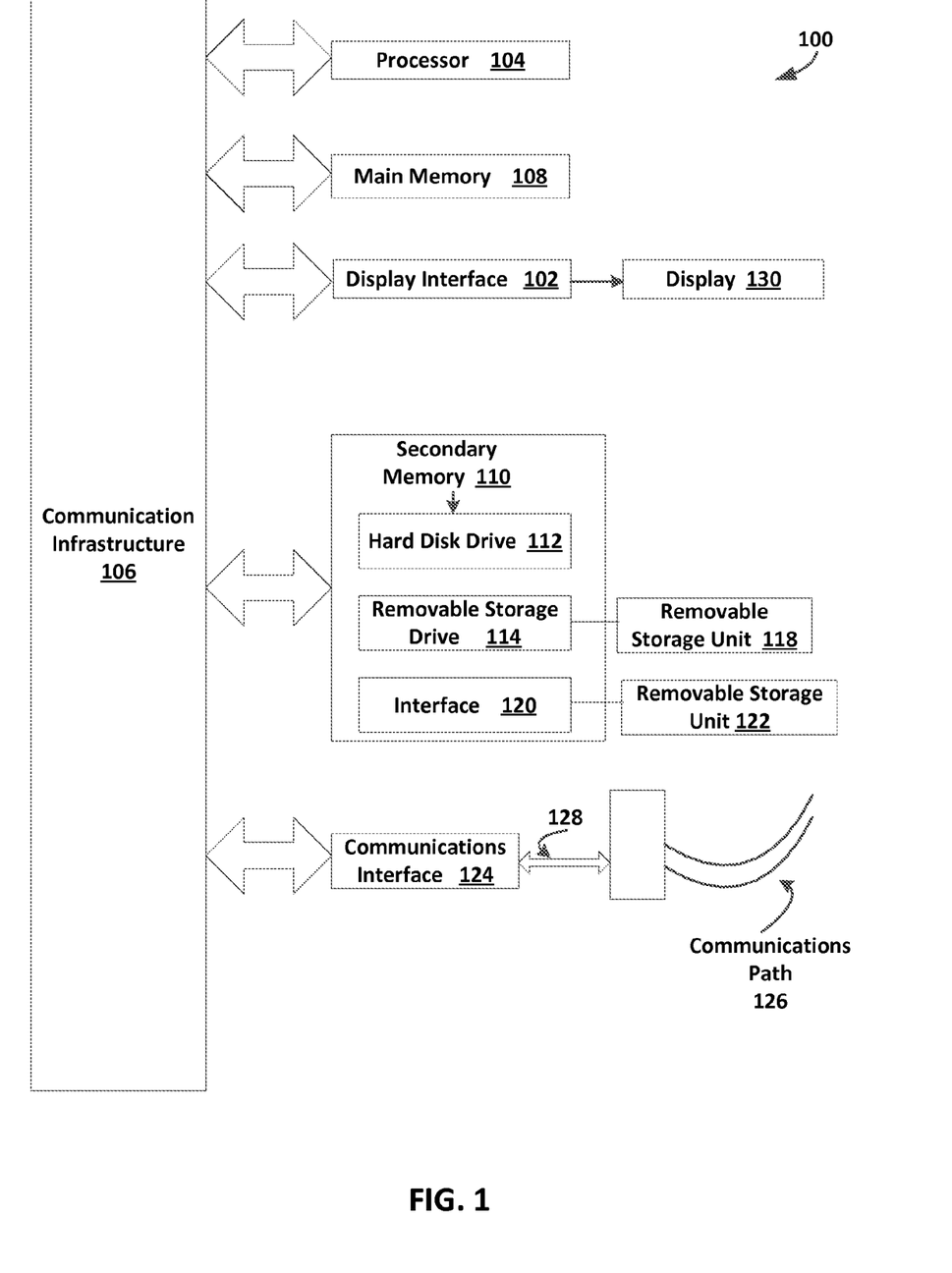
FIG. 1 is a block diagram of a non-limiting exemplary computing device useful for implementing one or more exemplary embodiments of the present disclosure.

In an embodiment, the disclosure is directed toward one or more computing devices capable of carrying out the functionality described herein. An example of a computing device 100 is shown in FIG. 1.

Computing device 100 includes one or more processors, such as processor 104. The processor 104 is connected to a communication infrastructure 106 (e.g., a communications bus or network). Various software aspects are described in terms of this exemplary computing device. After reading this description, it will become apparent to a person skilled in the relevant art(s) how to implement the disclosure using other computing devices and/or architectures.

Computing device 100 can include a display interface 102 that forwards graphics, text and other data from the communication infrastructure 106 (or from a frame buffer not shown) for display on the display unit 130.

Computing device 100 also includes a main memory 108, preferably random access memory (RAM) and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well-known manner. Removable storage unit 118 represents a floppy disk, magnetic tape, optical disk, etc. which is read by and written to by removable storage drive 114. As will be appreciated, the removable storage unit 118 includes a computer usable storage medium having stored therein computer software and/or data.

In an embodiment, secondary memory 110 may include other similar devices for allowing computer programs or other code or instructions to be loaded into computing device 100. Such devices may include, for example, a removable storage unit 122 and an interface 120. Examples of such may include a program cartridge and cartridge interface (such as that found in video game devices), a removable memory chip (such as an erasable programmable read only memory (EPROM) or programmable read only memory (PROM)) and associated socket and other removable storage units 122 and interfaces 120, which allow software and data to be transferred from the removable storage unit 122 to computing device 100.

Computing device 100 may also include a communications interface 124. Communications interface 124 allows software and data to be transferred between computing device 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of non-transitory signals 128 which may be electronic, electromagnetic, optical or other signals capable of being received by communications interface 124. These signals 128 are provided to communications interface 124 via a communications path (e.g., channel) 126. This channel 126 carries signals 128 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 114, a hard disk installed in hard disk drive 112 and signals 128. These computer program products provide software to computing device 100. The disclosure is directed to such computer program products.

Computer programs (also referred to as computer control logic) are stored in main memory 108 and/or secondary memory 110. Computer programs may also be received via communications interface 124. Such computer programs, when executed, enable the computing device 100 to perform the features of the present disclosure, as discussed herein. In particular, the computer programs, when executed, enable the processor 104 to perform the features of the present disclosure. Accordingly, such computer programs represent controllers of the computing device 100.

In an embodiment where the disclosure is implemented using software, the software may be stored in a computer program product and loaded into computing device 100 using removable storage drive 114, hard drive 112 or communications interface 124. The control logic (software), when executed by the processor 104, causes the processor 104 to perform the functions of the disclosure as described herein.

In an embodiment, the disclosure is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown in FIG. 1 may be configured as any number of computing devices such as a game console, a portable media player, a desktop, a laptop, a server, a tablet computer, a PDA, a mobile computer, a smart telephone, a mobile telephone, an intelligent communications device or the like.

In an embodiment, the disclosure is implemented using a combination of both hardware and software.

Figure 2:
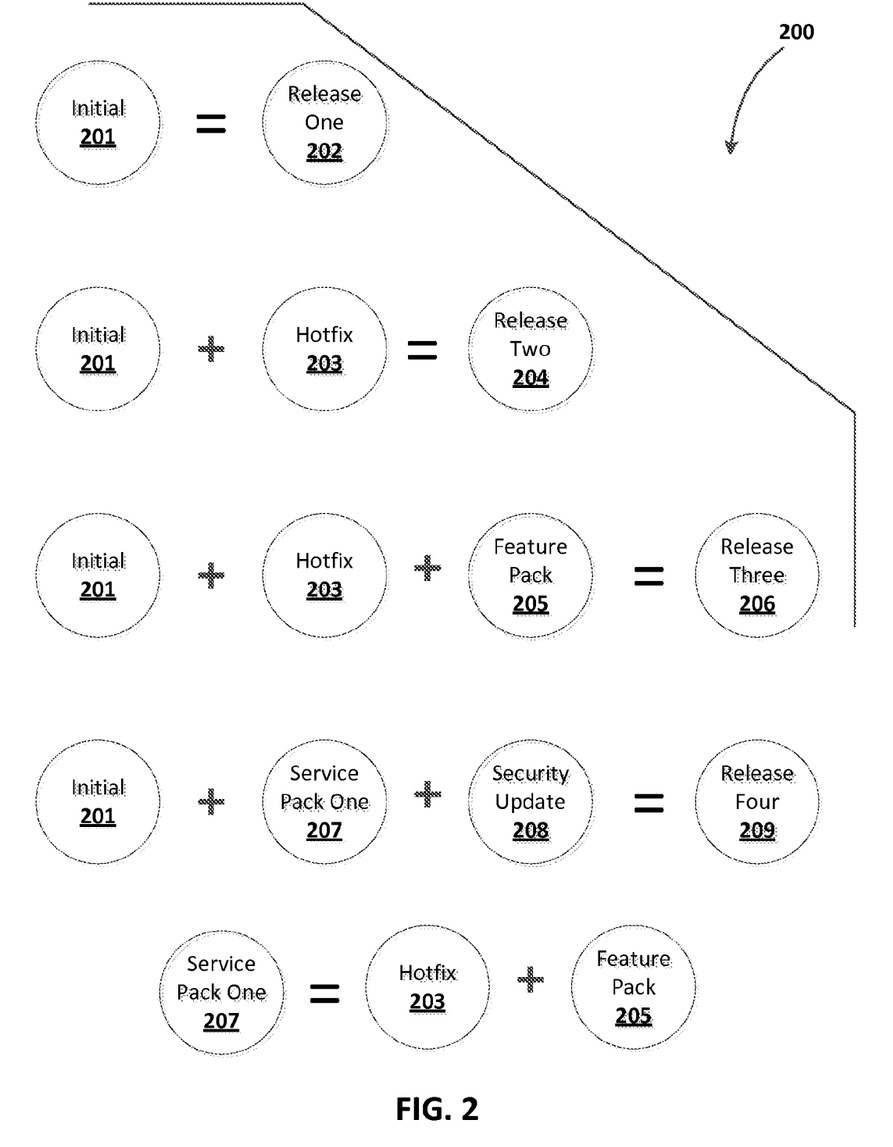
FIG. 2 is a block diagram illustrating a non-limiting exemplary data store containing all released product content for a software product, wherein such released product content may be stored in a cumulative and/or chronological manner, according to an embodiment of the present disclosure.

Referring to FIG. 2, an embodiment of a data store 200 is illustrated, which contains all product content shipped for every release of the software product. Such a data store 200 may be cumulative for each release of the software product and includes information necessary to detect product content on computing device 100. Notably, data store 200 indentifies such product content and where to access such product content during application of the updating process.

As will be appreciated by those skilled in the relevant art(s) after reading the description herein, software products are often updated after their initial release 201. That is, product content updates may released by the software product developer or third parties. FIG. 2 illustrates a graphical depiction of product content updates. Such exemplary product content updates may include, but are not limited to, patches, hot fixes 203, feature packs 205, service packs 207, audiovisual content and security updates 208. In many cases, especially for heavily used and/or popular software products, such product content updates are periodically released to maintain or improve the software product's integrity, usability and stability.

Still referring to FIG. 2, smaller hotfixes 203 and feature pack 205 are often repackaged as service pack one (SP1) 207 which, when installed on a computing device 100, update the installed product content in a manner that does not allow the user to downgrade the software product in intermediate steps. To revert to a previous software product configuration state, the user needs to completely uninstall service pack one (SP1) 207. In the embodiment illustrated in FIG. 2, the user is unable to revert from release four 209 to a previous hotfix release, such as release two 204, without first removing service pack one (SP1) 207 before installing hotfix 203. In many situations, software product developers do not make previous product content available after being included in a later released service pack one (SP1) 207. That is, reverting to release two 204 from release four 209 safely requires the user (administrator) to know the initial configuration state of the software product.

In the embodiment of FIG. 2, the initial configuration state of the software product may include release one 202, SP1 207 and a security update 208. If the user wants to revert backwards to a desired final configuration state—release two 204—of the software product, the user needs to know that release two 204 contains initial release 201 and hotfix 203. Alternatively, if the user wants to revert backwards to a desired final configuration state—release three 206—of the software product, the user needs to know that release three 206 contains initial release 201, hotfix 203 and feature pack 205. In each instance, the user needs to know the correct way (i.e., sequence) to safely revert to a desired final configuration state without negatively impacting stability, usability and security of the software product. Data store 200 provides such information in a succinct and identifiable manner.

In the embodiment of FIG. 2, the user has to remove security update 208 and SP1 207 and then install hotfix 203 to achieve the desired final configuration state of the software product—release two 204. If any portion of product content 200 is removed, modified or added in the wrong sequence, the installed product content on computing device 100 will become unstable, heavily impacting usability, repeatability and supportability; often requiring to user to reinstall the entire software product.

Figure 3:
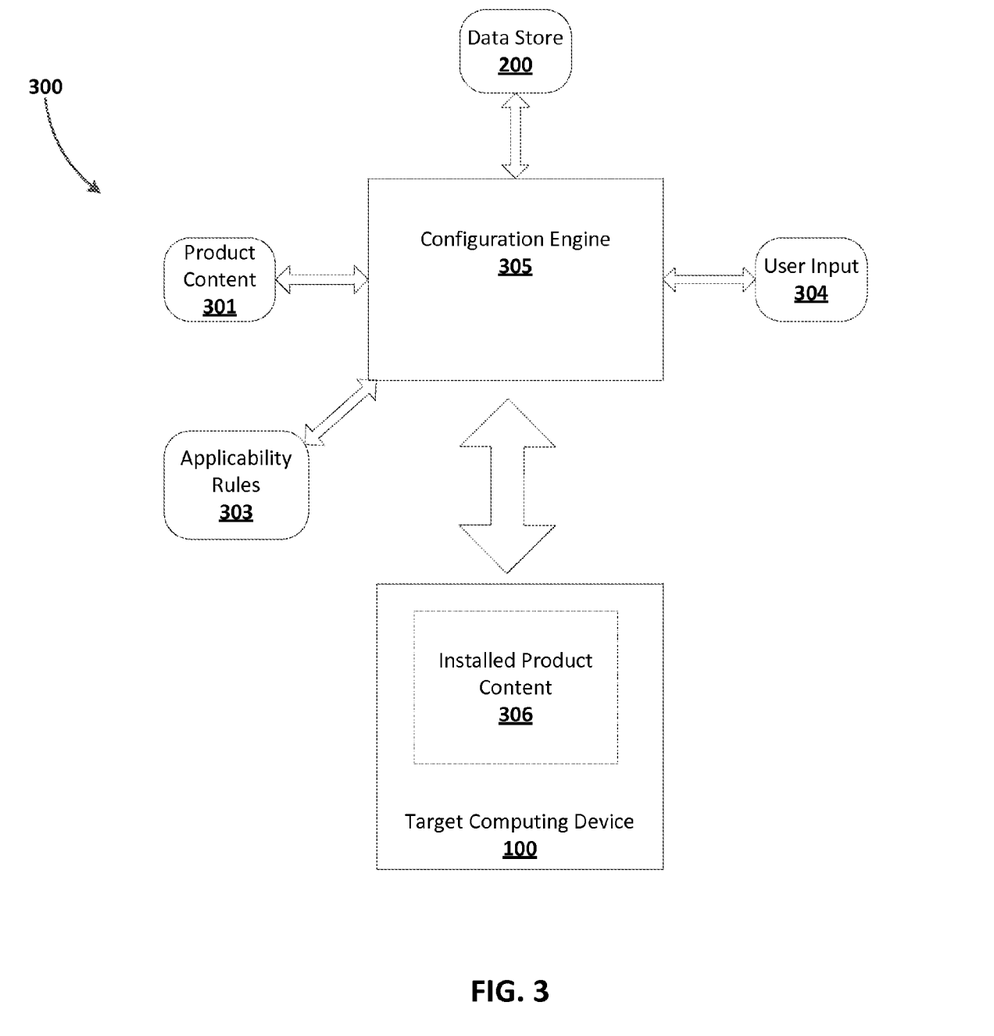
FIG. 3 is a high-level block diagram illustrating the interrelationship between selected major components that facilitate software product configuration management, according to an embodiment of the present disclosure.

Referring to FIG. 3, a high-level block diagram illustrating a software product configuration management environment (and the interrelationship between selected major components), according to an embodiment of the present disclosure, is shown. As will be appreciated by those skilled in the relevant art(s) after reading the description herein, computer program products, methods, and systems contained in environment 300 may occur on computing device 100 as part of an executing computer program (software) application for managing installed product content 306. Installed product content 306 may be on a target computing device 100. A target restore date of the final configuration state may be identified by user input 304.

In an embodiment, installed product content 306 may be located on several computing devices 100. Configuration engine 305 accesses installed product content 306 to determine which portion(s) of product content 301 (i.e., the initial release 201, hot fixes, 203, security updates 208, etc.) has been installed on target computing device 100.

In an embodiment, configuration engine 305 determines which portions of product content 301 are contained in installed product content 306 by analyzing a portion of the files contained in installed product content 306. That is, a file may be created and updated, which details the release version of installed product content 306 for the desired final configuration state.

In an embodiment, configuration engine 305 may analyze each file in the installed product content 306 to learn what product content 301 initially exist.

In an embodiment, configuration engine 305 may determine what product content 301 initially exists by searching files with specific names, sizes, and release dates. As will be apparent to those skilled in the relevant art(s) after the reading the disclosure herein, other methodologies (i.e., protocols/algorithms) may be employed for learning installed product content 306 initially existing on target computing device 100.

In an embodiment, the initial configuration state is based on what product content 301 initially exists in the installed product content 306. To properly characterize the initial configuration state, configuration engine 305 accesses data store 200. Such a data store 200 contains information on all released product content 301, such as substantive information of installed product content 306 and where to access requisite portions of such previously-installed product content 306 to achieve the desired final configuration state.

In an embodiment, data store 200 may be maintained up-to-date with information about the latest product content releases. Such maintenance may be performed by software developers of the software product. In an alternate embodiment, a third-party service provider may be allowed to update data store 200 (should there be no security risks). Information relating to third-party product content 301 may be included in data store 200, enabling configuration engine 305 to modify installed product content 306 with product content 301 from the third-party software product developer, their successors or from other third-party service providers (vendors).

In alternate embodiments, data store 200 may be located at the same computing device 100 as configuration engine 305, at a device remotely located from computing device 100 (e.g., host server for enterprise network), stored on a software product developer's server and accessed by configuration engine 305 via a communication link such as a dedicated Internet communication link, or located on multiple computing devices 100 (and thus configuration engine 305 preferably contains information on how to selectively access portions of data store 200).

In an embodiment, some or all installed product content 306 portions may be contained on target computing device 100.

In an embodiment, configuration engine 305 determines the initial configuration state of the software product (containing the installed product content 306) and, notifies the user of such an initial configuration state via a GUI (e.g., GUI 500 described herein below) or other interface.

In an embodiment, the user may not be informed of the initial configuration state either because it is not necessary or the user already possesses such knowledge.

In an embodiment, configuration engine 305 accepts user input 304, which may be provided via a GUI or other known communication interface device. User input 304 indicates the desired final configuration state of the software product (containing the installed product content 306) on target computing device 100. User input 304 may be queried and accepted by configuration engine 305 in any suitable manner known to one skilled in the relevant art(s). Some embodiments accept user input 304 via oral and/or typed command line inputs.

An embodiment may utilize user created ASCII files as user input 304.

Figure 5:
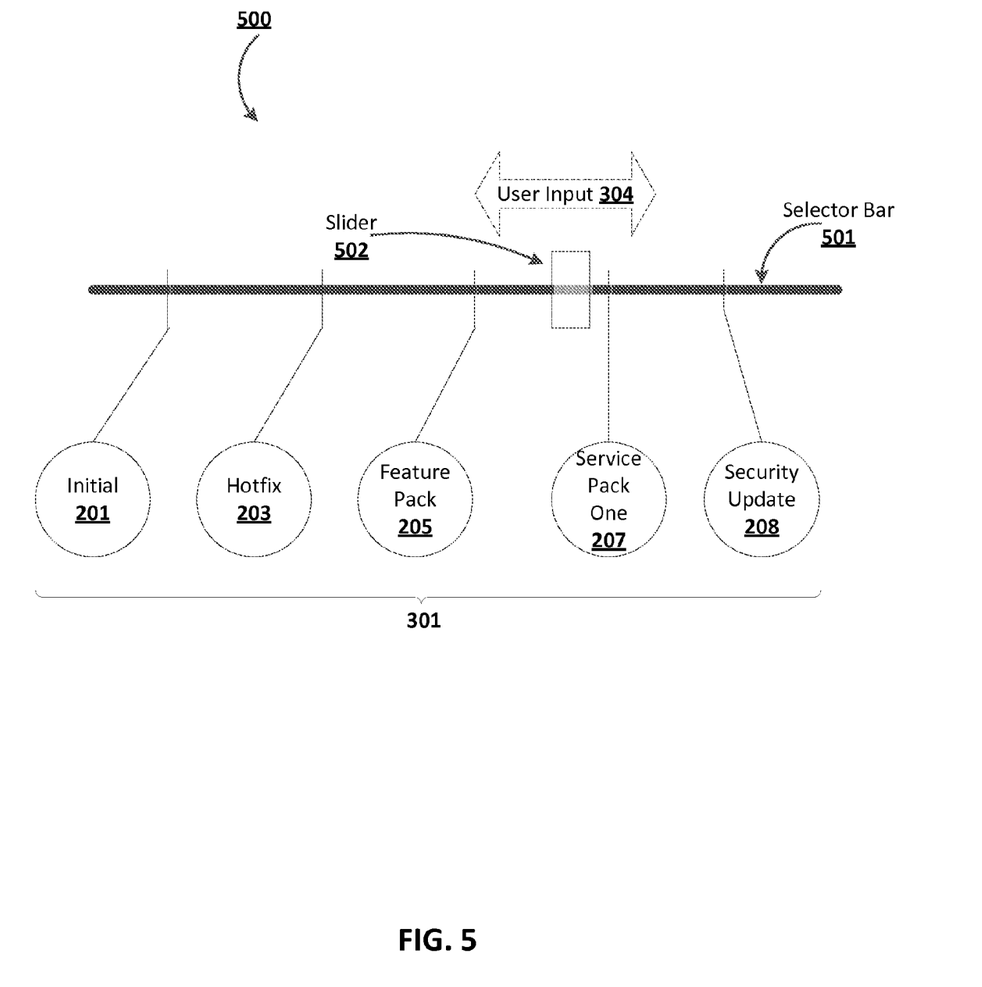
FIG. 5 is a screenshot illustrating a non-limiting exemplary graphical user interface (GUI), according to an embodiment of the present disclosure.

An embodiment may accept user input 304 via GUI 500 displayed on a screen of an application executed by computing device 100.

In an embodiment, user input 304 may be accepted in a limited fashion. That is, data store 200 may contain a cumulative record of all released product content 301 and associated release dates. The user may be provided with information regarding the initial configuration state of the software product, including the release dates of all installed product content 306; defining the initial configuration state. Such an initial configuration may be graphically illustrated on a timeline depicted on GUI screen 500 of an application executing on computing device 100. Product content 301, contained in data store 200, corresponding to the initial configuration state may also be illustrated.

Still referring to FIG. 3, applicability rules 303 determine requisite portions of product content 301 and how currently-installed product content 306 needs to be modified to achieve the desired final configuration state of the software product at target computing device 100.

In an embodiment, applicability rules 303 may be authored by the software product developer or third party service provider.

In an embodiment, applicability rules 303 contain information about compatibility of product content 301 with the hardware and/or software employed by target computing device 100. Applicability rules 303 may also contain information regarding the sequential order in which product content 301 needs to be loaded, installed, deleted and/or otherwise modified to maintain the stability and usability of installed product content 306 at the desired final configuration state.

In an embodiment, applicability rules 303 may contain other information about previously-installed product content 301 on target computing device 100 (i.e., memory requirements for each product content 301).

In an embodiment, applicability rules 303 may be contained at data store 200 and/or configuration engine 305.

In an embodiment, applicability rules accompany product content 301 and configuration engine 305 may integrate applicability rules 303 therein as it accesses product content 301.

In an embodiment, the user may not be authorized to modify previously-installed product content 306 with all released product content 301. For example, the user may only be authorized to utilize a portion of the released product content 301. In such a case, configuration engine 305, data store 200, applicability rules 303 and/or target computing device 100 may contain software instructions limiting the user's ability to achieve the final configuration state of the software product until permission is received from an authorized administrator.

In an embodiment, all released product content 301 is not located on a single, target computing device 100. That is, product content 301 may be located on one or more computing devices and remotely accessed by configuration engine 305 as needed. Configuration engine 305 may acquire released product content 301 only when updating the software product to achieve the desired final configuration state.

In an embodiment, a portion of product content 301 may be loaded onto a computing device containing configuration engine 305. That is, configuration engine 305 may reside and run on target computing device 100.

As will also be apparent to one skilled in the relevant art(s) after reading the description herein, data store 200, applicability rules 303 and configuration engine 305 that facilitate software product configuration management through a time shift responsive to user input, installation product content and software product applicability rules, may be part of the "standard" system that ships with a computing device 100 (e.g., as part of the operating system) or may be later added to an existing system as part of an update (or patch).

Figure 4:
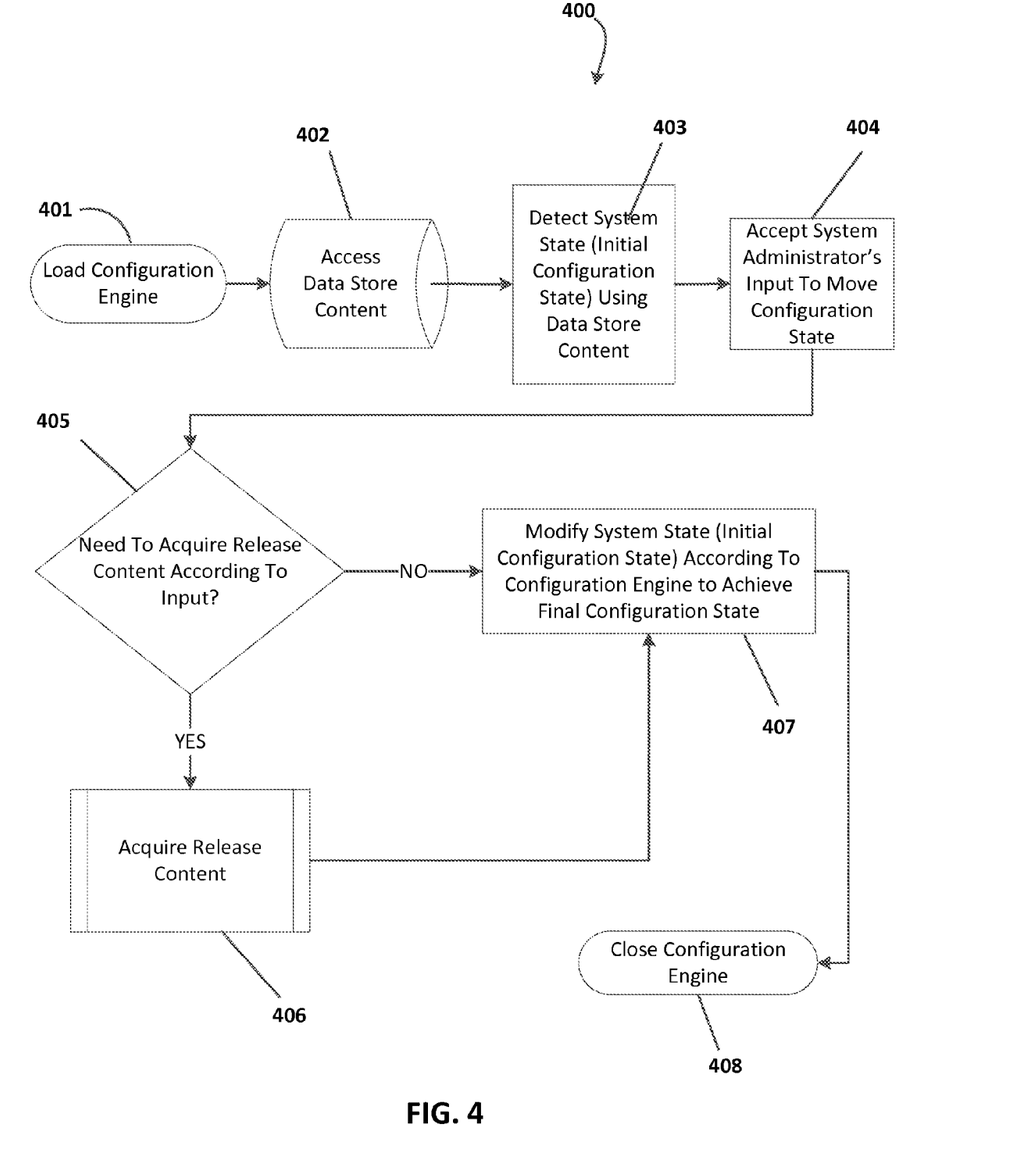
FIG. 4 is a flowchart illustrating a non-limiting exemplary software configuration management process, according to an embodiment of the present disclosure.

Referring to FIG. 4, a flowchart illustrating a software configuration management process 400, according to an embodiment of the present disclosure, is shown. Process 400 may be responsive to user input 304, applicability rules 303 and installed product content 306, as shown in FIG. 3. Initially, at step 401, a configuration engine 305 may be loaded. In an embodiment, such an initial step 401 may be manually performed by the user (administrator). In an embodiment, one or more configuration engines 305 may be loaded, at step 401, by an executable module. As described above, configuration engine 305 may be loaded onto target computing device 100. In an embodiment, configuration engine 305 may be loaded onto one or more computing device(s) capable of communicating with target computing device 100 containing installed product content 306.

In step 402, configuration engine 305 accesses data store 200 and uses product content information 306 contained therein. At step 403, configuration engine 305 uses information contained in data store 200 and/or applicability rules 303 to detect the presently installed product content 306 on target computing device 100. From such information, configuration engine 305 learns the initial configuration state of the software product.

After learning the initial configuration state of the software product, user input 304 is accepted at step 404, which informs the configuration engine 305 to modify the learned initial product configuration state to a desired final configuration state. At step 405, applicability rules 303 are applied for determining the necessary steps to modify installed product content 306 from the initial configuration state to the desired final configuration state. Based on applicability rules 303, configuration engine 305 determines additional product content 301 that needs to be acquired to modify the initial configuration state of the software product.

At step 406, if the configuration engine 305 determines product content 301 needs to be acquired, configuration engine 305 acquires product content 301 from data store 200, sources indicated by other product content 301 and/or applicability rules 303. That is, configuration engine 305 analyzes at least a portion of existing product content 301 to locate requisite product content 301 in data store 200, in accordance with applicability rules 303. If the indentified sources (containing product content 301) do not indicate a valid location of requisite product content 301, the user is prompted to provide such requisite product content 301.

In an embodiment, step 406 loads requisite portions of product content 301 onto target computing device 100.

In an embodiment, all product content 301 may be initially acquired, at step 406, before iterative modification begins at step 407.

In an embodiment, requisite product content 301 may be initially loaded onto another computing device containing configuration engine 305, data store 200, and/or applicability rules 303 and, thereafter, transferred to target computing device 100. At step 407, previously-installed product content 306 is modified according to applicability rules 303 and newly acquired requisite product content 301. Such a modification step 407 may occur directly on target computing device 100 or on other computing device(s) communicatively coupled to target computing device 100 (i.e., host server for an enterprise network).

In an embodiment, at step 407, as instructed by applicability rules 303, the modification process may be performed by installing all acquired requisite product content 301 in parallel with currently-installed product content 306.

In an embodiment, at step 407, as instructed by applicability rules 303, the modification process may be performed by installing all acquired requisite product content 301 in an iterative manner (iterative cycles) with currently-installed product content 306.

In an embodiment, process 400 may end, at step 408, by closing one or more configuration engines 305. That is, step 408 closes at least one configuration engine 305 used to modify installed product content 306. In an embodiment, step 408 may be performed by the user (administrator). In an embodiment, step 408 may be performed by a module executed by configuration engine 305 or other component executing on computing device 100.

Referring now to FIG. 5, a screenshot displaying a GUI 500, employing a slider bar responsive to an authorized user input 304 according to an embodiment of the present disclosure is shown. That is, GUI 500 is a timeline-based interface, which allows user input 304 to "time shift" the initial configuration state of the software product by selectively installing desired portions of product content 301. User input 304 may be displayed adjacent to the timeline of all released product content 301 associated with the user-chosen final configuration state of the software product. Each location on the timeline require configuration engine 305 to add, remove or otherwise modify unique portions of installed product content 306 to achieve the final configuration state of the software product.

In an embodiment, the user (administrator) input 304 is entered via GUI 500. The corresponding "time shift" notifies the user of the initial configuration state, including all installed product content 306. The "time shift" further identifies the desired final configuration state and requisite product content 301 that needs to be moved forward or backward in time relative to the user-chosen target date (i.e., final configuration state). That is, through GUI 500, the user is able to quickly instruct configuration engine 305 to modify installed product content 306 in a manner that does not require the user to know the updating sequence of requisite product content 301.

In an embodiment, step 404 may display GUI 500 on a screen of an application executing on target computing device 100. Selector bar 501 may be displayed and populated with information from data store 200. In an embodiment, such information may include a chronological display of released product content 301 according to release date(s). In an embodiment, product content 301 may be chronologically displayed according to other criteria, such as usability or additional functionality. In an embodiment, some released product content 301 may not be displayed, depending on its compatibility with target computing device 100 and requisite permission to access product content 301.

In an embodiment, product content 301 may be displayed in a linear, sequential pattern along selector bar (time line) 501 and in chronological order according to its release date (s). That is, the oldest release date (i.e., first release 201) may be located at the left side of selector bar 501 and the newest release (i.e., security update 208) may be located at the right side of selector bar 501. By displacing slider 502 along selector bar 501, the user identifies the desired final configuration state of the software product. Such an action may be defined as user input 304.

In an embodiment, the user may manipulate slider 502 via a cursor or other well-known interface(s).

In an embodiment, slider 502 is initially positioned on a portion of selector bar 501, which is designated as the learned initial configuration state of software product. Such a designation may be performed at step 403 of process 400. In an embodiment, a graphical icon is displayed at the initial position for visually indicating a beginning reference point on selector bar 501. The user may then choose the desired final configuration state by displacing slider 502, along selector bar 501, away from the initial position. The slider 502 may be moved forward or backward in time along selector bar 501.

In such an example, the user selects the desired final configuration state containing some, but not all of released product content 301 in SP1 207, which will be installed on target computing device 100 by configuration engine 305 without further input from the user.

In an embodiment, GUI 500 may display a listing of product content 306 contained in the initial configuration state of the software product. In an embodiment, GUI 500 may display information for the final configuration state including, but not limited to, requisite released product content 301 contained in data store 200, features of such requisite product content 301, and associated release dates thereof.

In an embodiment, the user may be warned of possible detrimental effects associated with user input 304 including, but not limited to, losses in functionality, usability, and exploits which may compromise the security of installed product content 306 and/or target computing device 100. That is, if selected portions of newly-released product content 301 are not compatible with selected portions of currently-installed product content 306, GUI 500 may display a message indicating this by, for example, changing the color or shape of a portion of selector bar 501.

In an embodiment, GUI 500 may provide a summary of the requisite product content 301 contained for the final configuration state in addition to links (i.e., hyperlinks directed to third-party websites) for more detailed information on the relevant product content 301.

Example 1

Figure 6:
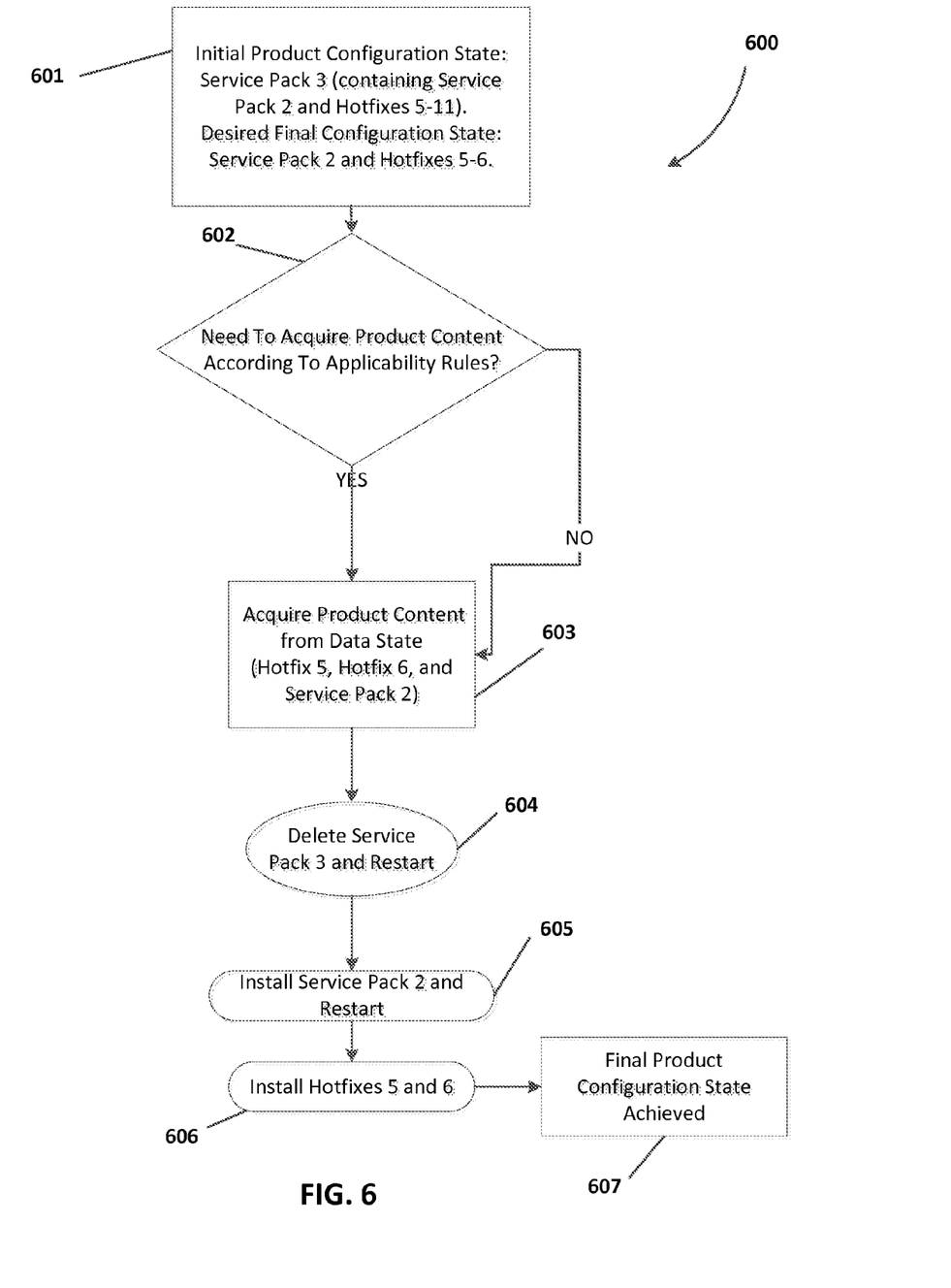
FIG. 6 is a flowchart illustrating a non-limiting exemplary software configuration management process according to an embodiment of the present disclosure.

Referring now to FIG. 6, a flowchart illustrating a software configuration management process 600 for accessing and reading most recent released product content 301 in data store 200, according to an embodiment, is shown. In process 600, previously-installed product content 306 is modified from an initial configuration state to a user-selected, final configuration state. At step 601, configuration engine 305 learns initial product configuration state by identifying/learning at least a portion of previously-installed product content 306 contained in service pack 3 (SP3). SP3 is a bundled release containing SP2 and hotfixes 5 through 11. The user-selected configuration state of the software product contains only SP2 and hotfix 5 and hotfix 6. Applicability rules 303 control the control logic algorithm executed in steps 602-608.

In step 602, applicability rules 303 determine whether installed product content 306 needs to be initially acquired before updating the software product. That is, applicability rules 303 determine that hotfix 5, hotfix 6, and SP2 needs to be initially acquired to achieve the desired final configuration state of the software product. If not, process 600 proceeds to step 604. Otherwise, in step 603, the requisite product content 301 is acquired from data store 200 according to applicability rules 303. In particular, SP2 and hotfixes 5 and 6 are acquired.

In step 604, SP3 is deleted and target computing device 100 is restarted. In an embodiment, applicability rules 303 may indicate other system actions, such as system restarts or modification of the registry, may need to occur to successfully achieve the desired final configuration state of the software product. In an embodiment, configuration engine 305 can perform such actions.

After restarting target computing device 100, in step 605, configuration engine 305 modifies installed product content 306 by installing SP2 and restarting target computing device 100. In step 606, configuration engine 305 installs hotfixes 5 and 6 and the final configuration state (identified by user in step 602) is achieved in step 607.

Example 2

Figure 7:
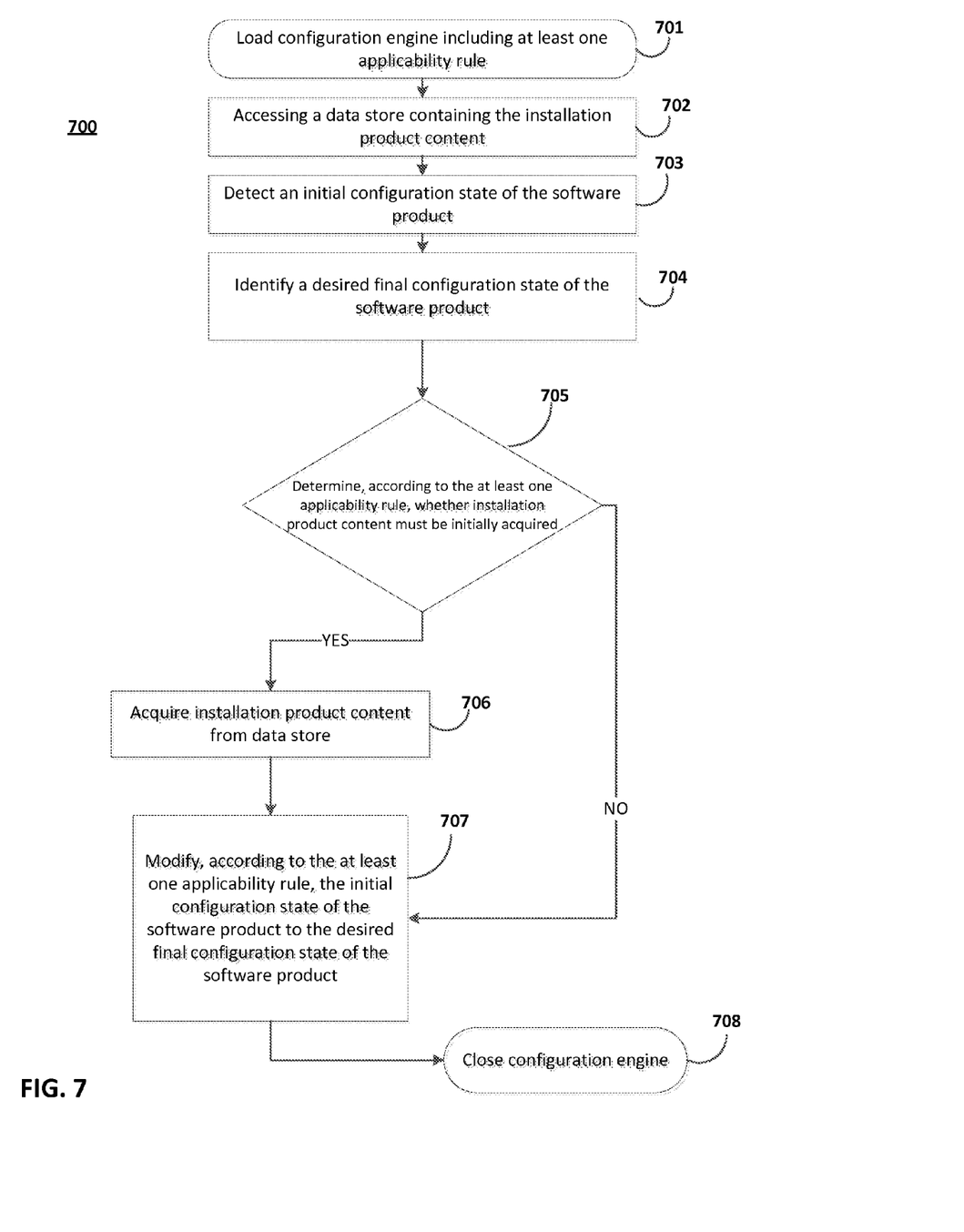
FIG. 7 is a flowchart illustrating method steps of a non-limiting exemplary software configuration management process wherein installed product content is modified from an initial configuration state to a desired final configuration state defined by an authorized user input, according to an embodiment of the present disclosure.

Referring now to FIG. 7, a flowchart illustrating method steps of a software configuration management method 700 wherein installed product content is modified from an initial configuration state to a desired final configuration state, according to an embodiment, is shown. At step 701, a configuration engine 305, including at least one applicability rule 303 for the software product executing on computing device 100, is loaded.

At step 702, a data store 200 containing the installation product content 301 is accessed. Then, at step 703, an initial configuration state of the software product is detected by analyzing at least a portion of the installation product content 306. At step 704, a desired final configuration state of the software product is identified. At step 705, it is determined whether the installation product content 301 needs to be initially acquired, according to at least one applicability rule 303, to achieve the desired final configuration state of the software product.

At step 706, when the installation product content 301 needs to be initially acquired (step 705 is positive), acquiring the installation product content 301 from the data store 200. Otherwise, when the installation product content 301 does not need to be initially acquired (step 705 is negative), method 700 proceeds to step 707. At step 707, according to at least one applicability rule 303, the initial configuration state of the software product is modified to the desired final configuration state of the software product.

In an embodiment, method 700 may further include, at step 703, the optional step of: providing the user, in response to detecting the initial configuration state of the software product, information about the initial configuration state of the software product.

In an embodiment, step 704 may include the optional step of identifying, via a user input 304, a time period associated with the desired final configuration state of the software product.

In an embodiment, step 704 may include the optional step of providing the user information about the desired final configuration state of the software product. In an embodiment, such information may be displayed on a GUI screen 500 of an application executing on a computing device.

In an embodiment, step 707 may include the steps of: removing, from the software product, an undesired portion of the installation product content 306; identifying a desired portion of the installation product content 301; and adding to the software product, in accordance with at least one applicability rule, the desired portion of the installation product content 301 wherein the desired portion of the installation product content 301 is associated with the desired final configuration state of the software product.

In an embodiment, all information (such as installation product content) necessary for achieving a desired final configuration state of the software product is loaded on target computing device 100 containing installed product content 306.

In an embodiment, only data store 200 and applicability rules 303 are loaded onto target computing device 100 containing the installed product content 306.

In an embodiment, configuration engine 305 is loaded onto target computing device 100 and remotely accesses other components of an (enterprise) network.

In an embodiment, all access to and modification of installed product content 306 is remotely executed (i.e., configuration engine 305, data store 200 and applicability rules 303 are not loaded on target computing device 100).

In an embodiment, process 700 may end, at step 708, by closing configuration engines 305. That is, step 708 closes configuration engine 305 used to modify installed product content 306. In an embodiment, step 708 may be performed by the user (administrator). In an alternate embodiment, step 708 may be performed by a module executed by configuration engine 305 or other component executing on computing device 100.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within computing devices other than those mentioned herein for illustration purposes).

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A method for providing configuration management of updates to a software product, comprising:
   with a computing processor,
      accessing a data store containing a chronological sequence of updates to at least a portion of the software product;
      identifying an initial configuration state of the software product as existing on a computing device, including analyzing at least a portion of previously installed updates to the software product on the computing device;
      identifying a target configuration state of the software product on the computing device, the target configuration state including a portion of the previously installed updates to the software product on the computing device;
      determining, based on the chronological sequence of updates in the accessed data store, (1) a sequence of removal and/or re-installation of at least some of the previously installed updates, and (2) whether at least one of the previously installed updates needs to be re-acquired; and
      in response to determining that none of the previously installed updates needs to be re-acquired, modifying the initial configuration state of the software product to the target configuration state of the software product in accordance with the determined sequence of removal and/or re-installation;

in response to determining that at least one of the previously installed updates needs to be re-acquired,
acquiring the at least one of the previously installed updates; and
with the acquired at least one of the previously installed updates, modifying the initial configuration state of the software product to the target configuration state of the software product in accordance with the determined sequence of removal and/or installation.

2. The method of claim 1, wherein the computing device is one of a desktop computer; a mobile computer; a server; a tablet computer; a PDA; or a mobile telephone.

3. The method of claim 1, further comprising:
providing a user information about the detected initial configuration state of the software product.

4. The method of claim 1, wherein identifying a target configuration state includes:
identifying, via a user input, a time period associated with the target configuration state of the software product.

5. The method of claim 1, further comprising:
providing a user information about the target configuration state of the software product.

6. The method of claim 5, wherein the information is displayed on a graphical user interface screen of an application executing on the computing device.

7. The method of claim 1, wherein modifying the initial configuration state with the acquired at least one of the subset of the previously installed updates includes, in accordance with the determined sequence of removal and/or installation,:
removing, from the computing device, a portion of the previously installed updates associated with the software product; and
re-installing the acquired at least one of the subset of the previously installed updates to the software product on the computing device.

8. A computing system for providing configuration management of updates to a software product, comprising:
a computing processor and a memory containing instructions that, when executed by the computing processor, cause the computing processor to perform a process including:
accessing a data store containing a chronological sequence of updates to at least a portion of the software product;
performing an analysis of at least a portion of previously installed updates to the software product as existed on the computing device, each update including a software patch, a hotfix, a feature pack, a service pack, a visual file, an audio file, or an audiovisual file associated with the software product;
determining an initial configuration state of the software product as existed on the computing device based on the performed analysis, the initial configuration state including an identification of each previously installed update to the software product as existed on the computing device;
identifying a target configuration state for the software product, the target configuration state including a portion of the previously installed updates to the software product as existed on the computing device;
determining a sequence of removal of a first subset and optionally re-installation of a second subset of the previously installed updates to the software product based on the chronological sequence of released updates to the software product;
determining if at least one update of the second subset needs to be re-acquired;
in response to determining that at least one update of the second subset needs to be re-acquired, re-acquiring the at least one update of the second subset; and
modifying the software product on the computing device from the initial configuration state to the target configuration state in accordance with the determined sequence.

9. The computing system of claim 8 wherein determining the sequence of removal includes determining a sequence of removal of the first subset of the previously installed updates without re-installation of the second subset of the previously installed updates.

10. The computing system of claim 8 wherein determining the sequence of removal includes determining a sequence of removal of the first subset of the previously installed updates and subsequent re-installation of the second subset of the previously installed updates.

11. The computing system of claim 8 wherein determining the sequence of removal includes determining a sequence of removal of the first subset of the previously installed updates and subsequent re-installation of the second subset of the previously installed updates, at least one update in the second subset is a part of an update in the first subset.

12. The computing system of claim 8 wherein:
determining the sequence of removal includes determining a sequence of removal of the first subset of the previously installed updates and subsequent re-installation of the second subset of the previously installed updates; and
the process performed by the computing processor further includes
in response to determining that the at least one update of the second subset of the previously installed updates needs to be re-acquired, downloading the at least one update of the second subset of the previously installed updates.

13. The computing system of claim 8 wherein determining the sequence of removal includes determining a sequence of:
removal of a service pack to the software product, the service pack having a plurality of software patches, hotfixes, feature packs, visual files, audio files, or audiovisual files; and
subsequent re-installation of at least one of the software patches, hotfixes, feature packs, visual files, audio files, or audiovisual files included in the removed service pack.

14. The computing system of claim 8 wherein:
determining the sequence of removal includes determining a sequence of:
removal of a service pack to the software product, the service pack having a plurality of software patches, hotfixes, feature packs, visual files, audio files, or audiovisual files; and
subsequent re-installation of at least one of the software patches, hotfixes, feature packs, visual files, audio files, or audiovisual files included in the removed service pack; and
the process performed by the computing processor further includes:
determining whether the at least one of the software patches, hotfixes, feature packs, visual files, audio files, or audiovisual files included in the removed service pack needs to be re-acquired; and
in response to determining that the at least one of the software patches, hotfixes, feature packs, visual files, audio files, or audiovisual files included in the removed service pack needs to be re-acquired, re-acquire the at least one of the software patches, hotfixes, feature packs, visual files, audio files, or audiovisual files included in the removed service pack.

15. The computing system of claim 8 wherein identifying the target configuration state includes:
   receiving a user input of a time period associated with the released updates to the software product; and
   determining the portion of the previously installed updates to the software product as existed on the computing device based on the chronological sequence of released updates to the software product.

16. The computing system of claim 8 wherein:
   the method further includes displaying the initial configuration state of the software product as existed on the computing device on a graphical user interface; and
   identifying the target configuration state includes:
      receiving a user input of a time period associated with the released updates to the software product from the graphical user interface; and
      determining the portion of the previously installed updates to the software product as existed on the computing device based on the chronological sequence of released updates to the software product.

17. A computing system for providing configuration management of updates to a software product, comprising:
   a computing processor and a memory containing instructions that, when executed by the computing processor, cause the computing processor to perform a process including:
      accessing a data store containing a chronological sequence of updates to at least a portion of the software product;
      determining an initial configuration state of the software product as existed on the computing device, the initial configuration state including an identification of each of previously installed updates to the software product as existed on the computing device;
      receiving an input for a target configuration state for the software product, the target configuration state including a portion of the previously installed updates to the software product;
      determining a sequence of removal of a first subset and re-installation of a second subset of the previously installed updates to the software product based on the chronological sequence of released updates to the software product;
      determining if at least one update of the second subset needs to be re-acquired;
      in response to determining that at least one update of the second subset needs to be re-acquired, re-acquiring the at least one update of the second subset; and
      modifying the software product on the computing device from the initial configuration state to the target configuration state in accordance with the determined sequence.

18. The computing system of claim 17 wherein accessing the data store includes accessing a data store on the computing device to retrieve the chronological sequence of released updates to the software product.

19. The computing system of claim 17 wherein accessing the data store includes accessing a data store on a remote server to retrieve the chronological sequence of released updates to the software product.

20. The computing system of claim 17 wherein the process performed by the computing processor further includes:
   in response to determining that at least one update of the second subset of the previously installed updates needs to be re-acquired, downloading the at least one update of the second subset of the previously installed updates.

* * * * *